United States Patent
Mishra

(10) Patent No.: US 7,274,848 B1
(45) Date of Patent: Sep. 25, 2007

(54) HIGH FIGURE OF MERIT DISPERSION COMPENSATING OPTICAL FIBER FOR TRANSMISSION FIBER AND TRANSMISSION SYSTEM UTILIZING SAME

(75) Inventor: Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/512,558

(22) Filed: Aug. 30, 2006

(51) Int. Cl.
   *G02B 6/02* (2006.01)
   *G02B 6/44* (2006.01)
(52) U.S. Cl. .................. 385/127; 385/124; 385/100
(58) Field of Classification Search .............. 385/127, 385/124, 100
   See application file for complete search history.

(56) References Cited

U.S. PATENT DOCUMENTS

| | | | |
|---|---|---|---|
| 6,757,468 B2 | 6/2004 | Bickham et al. | 385/127 |
| 6,768,852 B2 | 7/2004 | Zhang | 385/127 |
| 6,888,993 B2 | 5/2005 | Zhang | 385/127 |
| 6,925,237 B2* | 8/2005 | Hebgen et al. | 385/124 |
| 6,987,918 B1 | 1/2006 | Bickham | 385/127 |
| 2002/0176678 A1* | 11/2002 | Mukasa | 385/127 |
| 2004/0008958 A1 | 1/2004 | Bickham | 385/124 |
| 2007/0065081 A1* | 3/2007 | Antona et al. | 385/123 |

* cited by examiner

*Primary Examiner*—K. Cyrus Kianni
(74) *Attorney, Agent, or Firm*—Joseph M. Homa; Svetlana Z. Short

(57) ABSTRACT

A dispersion compensating optical fiber is disclosed having a high figure of merit. The optical fiber is highly dispersive and has low attenuation. The dispersion compensating optical fiber is suited for use with transmission optical fiber such as conventional single mode fiber. An optical transmission fiber and optical transmission system are also disclosed.

20 Claims, 4 Drawing Sheets

HIGH FIGURE OF MERIT DISPERSION COMPENSATING OPTICAL FIBER FOR TRANSMISSION FIBER AND TRANSMISSION SYSTEM UTILIZING SAME

BACKGROUND OF THE INVENTION

1. Field of the Invention

The present invention relates generally to optical fiber, and particularly to dispersion compensating optical fibers and systems employing same.

2. Technical Background

Competitive telecommunications markets demand higher bit rate transmission, and optical fiber needs to support the higher rates. Known positive dispersion optical fibers, such as SMF28e® transmission optical fiber from Corning Incorporated, which have a zero dispersion at around 1310 nm, are used for transmissions in the C-band (1525-1560 nm) or 1530 to 1570 nm. Chromatic dispersion are such wavelengths is a major concern for these transmission fibers. Dispersion Compensating Modules (DCMs) are typically used to handle the loss of signal due to positive dispersion. These DCMs incorporate a suitable length of Dispersion Compensating Fiber (DCF) to compensate for the positive dispersion. The present market demands smaller insertion loss (IL) and also the ability to cover a wide range of wavelengths. One way of reducing IL is to use smaller lengths of dispersion compensating fiber to compensate for the same length of the transmission SMF28 fiber. The quantity dispersion/attenuation is known as figure of merit (FOM), wherein it is desirable to have higher FOM.

SUMMARY OF THE INVENTION

Dispersion compensating optical fiber ("DCF") disclosed herein is highly dispersive and exhibits low attenuation at operating wavelengths in the C-band, or from 1530 to 1570 nm. High negative dispersion and low attenuation at 1550 nm provides a high figure of merit (absolute magnitude of ratio of dispersion divided by attenuation, both at 1550 nm). The DCF disclosed herein also provides a kappa (ratio of dispersion divided dispersion slope) that provides dispersion compensation for an optical transmission fiber ("transmission fiber") at a plurality of wavelengths within a wavelength band. Also disclosed herein are optical fiber transmission lines which comprise transmission fiber and such DCF. Some embodiments of the DCF disclosed herein are particularly well suited for compensating the dispersion of transmission fiber having dispersion between 14 and 22 ps/nm-km at wavelengths between 1530 and 1570 nm, such as SMF-28e optical fiber manufactured and sold by Corning Incorporated. The transmission fiber may have a dispersion slope at 1550 nm of less than 0.07 ps/nm²-km, or less than 0.07 ps/nm²-km and greater than 0.05 ps/nm²-km, such as SMF-28e optical fiber. In some embodiments, an optical fiber transmission line is disclosed herein comprising a transmission optical fiber having a dispersion at 1550 nm between 14 and 22 ps/nm-km and a dispersion slope at 1550 nm less than 0.07 ps/nm²-km optically coupled to at least one DCF disclosed herein.

The DCF disclosed herein comprises a core disposed about a centerline, and a cladding surrounding the core. The core comprises a central segment extending radially outward from the centerline, a first annular segment surrounding the central segment, and a second annular segment surrounding the first annular segment.

In one aspect, an optical fiber transmission line is disclosed herein comprising a positive dispersion positive dispersion slope transmission optical fiber and the dispersion compensating fiber optically coupled to the transmission optical fiber.

Reference will now be made in detail to the present preferred embodiments of the invention, examples of which are illustrated in the accompanying drawings.

DETAILED DESCRIPTION OF THE PREFERRED EMBODIMENT

Figure 1:
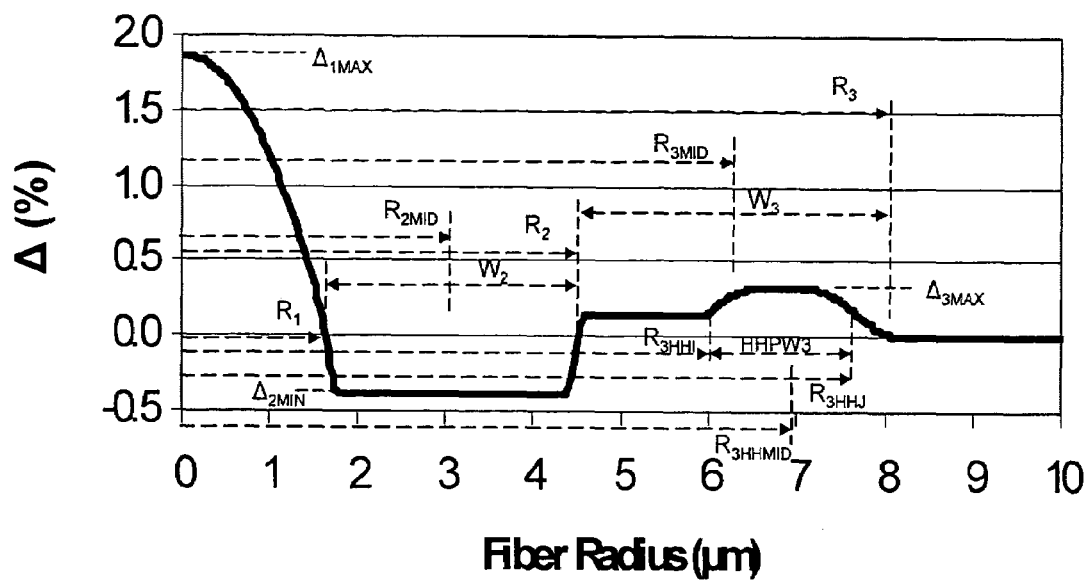
FIG. 1 shows a relative refractive index profile corresponding to a first embodiment of optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

"Effective area" is defined as:

$$A_{eff}=2\pi(\int f^2 r dr)^2/(\int f^4 r dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" or "alpha profile" refers to a relative refractive index profile, expressed in terms of $\Delta(r)$ which is in units of "%", where r is radius, which follows the equation, $$\Delta(r)=\Delta(r_o)(1-[|r-r_o|/(r_f-r_o)]^\alpha),$$

where $r_o$ is the point at which $\Delta(r)$ is maximum, $r_1$ is the point at which $\Delta(r)$ % is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2=(2\int f^2 \, r \, dr/[df/dr]^2 \, r \, dr)$, the integral limits being 0 to ∞.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied tot he plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Unless otherwise noted herein, optical properties (such as dispersion, dispersion slope, etc.) are reported for the LP01 mode. Unless otherwise noted herein, a wavelength of 1550 nm is the reference wavelength.

An optical transmission line as used herein includes a length of optical fiber, or a plurality of optical fibers fused together serially, extending between optical devices, for example between two optical amplifiers, or between a multiplexing device and an optical amplifier. The optical transmission line may comprise transmission fiber and dispersion compensating fiber, wherein the dispersion compensating fiber may be deployed in a module (DC module) or laid out lengthwise, or both, as selected to achieve a desired system performance or parameter such as residual dispersion at the end of an optical transmission line.

The optical fiber 10 disclosed herein comprises a core 100 and a cladding layer (or cladding) 200 surrounding and directly adjacent the core. The cladding 200 has a refractive index profile, $\Delta_{CLAD}(r)$. Preferably, the cladding 200 consists of pure silica.

The core 100 preferably comprises silica doped with germanium, i.e. germania doped silica. Dopants other than germanium, singly or in combination, may be employed within the core, and particularly at or near the centerline, of the optical fiber disclosed herein to obtain the desired refractive index and density. The core 100 of the optical fiber disclosed herein comprises a relative refractive index profile with both positive and negative segments. The core 100 is surrounded by and directly adjacent to a cladding layer 200.

Dispersion compensating optical fiber 10 disclosed herein comprises a core 100, disposed about a centerline and comprising a refractive index profile, and a cladding 200 surrounding the core. The core 100 comprises a central segment 20 extending radially outwardly from the centerline, a first annular segment 30 surrounding and in contact with the central segment 20, and a second annular segment 50 surrounding and in contact with the first annular segment 30. The central segment 20 has a relative refractive index profile, $\Delta_1(r)$, having a maximum relative refractive index $\Delta_{1MAX}$, wherein $\Delta_1(r)$ is positive. The first annular segment 30 has a relative refractive index profile, $\Delta_2(r)$, having a minimum relative refractive index $\Delta_{2MIN}$, wherein $\Delta_2(r)$ is negative. The second annular segment 50 has a relative refractive index profile, $\Delta_3(r)$, having a maximum relative refractive index $\Delta_{3MAX}$, wherein $\Delta_3(r)$ is non-negative, and wherein $\Delta_3(r)$ is positive in at least a portion of the second annular segment.

The central segment 20 extends from the centerline to a radius R1 where Δ=0%, i.e. where the relative refractive index profile crosses the Δ=0% axis and goes from positive in the central segment 20 to negative in the first annular segment 30.

First annular segment (or moat) 30 surrounds the central segment 20 and is directly adjacent thereto, extending radially outwardly to a first annular segment outer radius, $R_2$, where Δ first reaches 0%, i.e. where the relative refractive index profile reaches the $\Delta=0\%$ axis i.e. goes from negative in the first annular segment 30 to non-negative in the second annular segment 50. First annular segment 30 has a width $W_2$ (=R2−R1) disposed at a midpoint $R_{2MID}$(=(R1+R2)/2) and has a relative refractive index percent, $\Delta_2\%$ (r) and a minimum relative refractive index $\Delta_{2MIN}$. The first annular segment 30 is directly adjacent the central core segment 20.

Second annular segment (or ring) 50 surrounds the first annular segment 30 and is directly adjacent thereto and extends to a second annular segment outer radius R3 where the relative refractive index profile first reaches $\Delta=0.03\%$ at a radial location greater than the radius where $\Delta_{3MAX}$ occurs. Segment 50 has a width $W_3$ (=R3−R2) disposed at a midpoint $R_{3MID}$(=(R2+R3)/2), and has a positive relative refractive index percent, $\Delta_3\%$ (r)>0, and $\Delta_{1MAX}>\Delta_{3MAX}>0$. The second annular segment 50 has a non-negative relative refractive index profile wherein at least a portion of the segment 50 has a positive relative refractive index profile with a "peak" or a maximum relative refractive index percent, $\Delta_{3MAX}$. $R_{3HHi}$ marks the first radially inward, or centermost, occurrence of the half-height of $\Delta_{3MAX}$. $R_{3HHj}$ marks the first radially outward occurrence of the half-height of $\Delta_{3MAX}$. The ring half-height peak width $HHPW_3$ is bounded by inner and outer radii, $R_{3HHi}$ and $R_{3HHj}$, respectively. The midpoint of the ring half-height peak width $HHPW_3$ occurs at a radius $R_{3HHMID}$ which is half the radial distance between $R_{3HHi}$ and $R_{3HHj}$. $\Delta_{3MAX}$ may occur at $R_{3HHMID}$. In some embodiments, $R_{3HHMID}$ coincides with the middle of the segment 50, $R_{3MID}$, between $R_2$ and $R_3$. The second annular segment 50 is directly adjacent the first annular segment 30.

Cladding 200 surrounds the second annular segment 50 and is adjacent thereto and has a relative refractive index percent, $\Delta_c\%$ (r). Cladding 200 constitutes the outermost silica part of the fiber. The core ends and the cladding begins at a radius $R_{CORE}$. The silica part of the fiber is preferably coated, such as with conventional coatings.

In some embodiments, the core comprises a relative refractive index profile having a so-called centerline dip which may occur as a result of one or more optical fiber manufacturing techniques. However, the absence of a centerline dip in any of the refractive index profiles disclosed herein is preferred.

The refractive index profiles of the optical fibers disclosed herein provide a dispersion at 1550 nm more negative than −145 ps/nm/km, a kappa at 1550 nm greater than 250 nm, and a figure of merit at 1550 nm of greater than 330 ps/nm/dB, wherein the kappa is the ratio of dispersion at 1550 nm divided by dispersion slope at 1550 nm, and wherein the figure of merit is the absolute magnitude of the ratio of dispersion at 1550 nm divided by spectral attenuation at 1550 nm.

In some embodiments, the dispersion at 1550 nm is between −145 and −250 ps/nm/km.

In some embodiments, kappa at 1550 nm is between 260 and 305 ps/nm/km.

In some embodiments, the figure of merit at 1550 nm is between 340 and 565 ps/nm/dB.

The spectral attenuation at 1550 nm is less than 0.5 dB/km. Preferably, the spectral attenuation at 1550 nm is no more than 0.45 dB/km.

In some embodiments, the refractive index profile provides an effective area at 1550 nm greater than 18.0 μm². In some embodiments, the refractive index profile provides an effective area at 1550 nm between 18.0 and 22.0 μm².

In some embodiments, the product of the effective area at 1550 nm and the absolute magnitude of the dispersion at 1550 nm is greater than 2800 attoseconds. In some embodiments, the product is between 2800 and 6000 attoseconds. In some embodiments, the product is greater than 3000 attoseconds. In some embodiments, the product is between 3000 and 6000 attoseconds.

In preferred embodiments, the refractive index profile provides dispersion of between −130 and −270 ps/nm/km at all wavelengths between 1530 and 1570 nm.

The dispersion slope at 1550 nm is between −0.45 and −1.00 ps/nm²/km.

The optical fiber disclosed herein is single-moded at 1550 nm, more preferably single-moded at wavelengths above 1530 nm.

The second annular segment comprises a maximum relative refractive index $\Delta_{3MAX}$ less than or equal to 0.35%, preferably less than or equal to 0.33%. In some embodiments, $\Delta_{3MAX}$ less than or equal to 0.30%. In some embodiments, $\Delta_{3MAX}$ less than or equal to 0.25%. In some embodiments, $\Delta_{3MAX}$ less than or equal to 0.20%. In some embodiments, $\Delta_{3MAX}$ less than or equal to 0.15%. Preferably, $\Delta_{3MAX}$ is greater than or equal to 0.10%.

In some embodiments, the second annular segment comprises an inner portion comprising a radial width between 1.0 and 1.5 μm and a maximum relative refractive index less than or equal to 0.15%, and in some of these embodiments between 0.10 and 0.15%.

The central segment comprises a maximum relative refractive index $\Delta_{1MAX}$ greater than 1.80%, and in some embodiments between 1.87 and 2.00%.

The first annular segment comprises a minimum relative refractive index $\Delta_{2MIN}$ more negative than −0.35%, and in some embodiments between −0.35% and −0.65%.

The central segment extends to a radius, R1, between 1.0 and 2.0 μm, and in some embodiments between 1.30 and 1.80 μm. In some embodiments R1 is between 1.40 and 1.70 μm.

The first annular segment extends to a radius, R2, between 4.0 and 5.0 μm. The first annular segment extends for a radial width, $W_2$, between 2.5 and 3.7 μm, and in some embodiments between 2.6 and 3.6 μm. The first annular segment has a midpoint, $R_{2MID}$, between 2.5 and 3.5 μm, and in some embodiments between 2.8 and 3.3 μm.

The second annular segment extends to a radius, R3, between 7.2 and 8.2 μm, and in some embodiments between 7.4 and 8.0 μm. The second annular segment extends for a radial width, $W_3$, between 2.4 and 3.9 μm, and in some embodiments between 2.5 and 3.8 μm. The second annular segment has a radial half-height peak width, HHPW3, between 1.5 and 3.5 μm, and in some embodiments between 1.7 and 3.4 μm. The second annular segment has a midpoint, $R_{3MID}$, between 5.8 and 6.5 μm, and in some embodiments between 5.9 and 6.5 μm. The second annular segment has a half-height peak width midpoint, $R_{3HHMID}$, between 5.7 and 7.0 μm, and in some embodiments between 5.8 and 6.9 μm.

Tables 1-2 list an illustrative set of embodiments, Examples 1-3. FIG. 1 shows the corresponding relative refractive index profile of Example 1 in curve 1. Examples 2-3 have similar profiles, as further defined by Table 1. Embodiments such as these have first annular segments with a generally symmetric refractive index profile and second annular segments with a generally asymmetric refractive index profile.

TABLE 1

| Example | | 1 | 2 | 3 |
|---|---|---|---|---|
| $\Delta_{1MAX}$ | % | 1.87 | 1.87 | 1.87 |
| $\alpha 1$ | | 2.0 | 2.0 | 2.0 |
| R1 | μm | 1.7 | 1.7 | 1.7 |
| $\Delta_{2MIN}$ | % | −0.38 | −0.39 | −0.41 |
| R2 | μm | 4.5 | 4.5 | 4.5 |
| W2 | μm | 2.9 | 2.9 | 2.9 |
| $R_{2MID}$ | μm | 3.1 | 3.1 | 3.1 |
| $\Delta_{3MAX}$ | % | 0.33 | 0.33 | 0.14 |
| R3HHi | μm | 6.0 | 6.0 | 6.0 |
| R3HHJ | μm | 7.7 | 7.7 | 7.7 |
| HHPW3 | μm | 1.7 | 1.7 | 1.7 |
| $R_{3HHMID}$ | μm | 6.9 | 6.9 | 6.9 |
| $R3 = R_{CORE}$ | μm | 8.0 | 8.0 | 8.0 |
| W3 | μm | 3.5 | 3.5 | 3.5 |
| $R_{3MID}$ | μm | 6.3 | 6.3 | 6.3 |

TABLE 2

| Example | | 1 | 2 | 3 |
|---|---|---|---|---|
| Dispersion | | | | |
| @ 1530 nm | ps/nm/km | −135 | −138 | −145 |
| @ 1540 nm | ps/nm/km | −140 | −144 | −152 |
| @ 1546 nm | ps/nm/km | −143 | −144 | −156 |
| @ 1550 nm | ps/nm/km | −145 | −149 | −158 |
| @ 1560 nm | ps/nm/km | −150 | −154 | −164 |
| @ 1570 nm | ps/nm/km | −153 | −158 | −168 |
| D. Slope @ 1546 nm | ps/nm$^2$/km | −0.50 | −0.53 | −0.60 |
| D. Slope @ 1550 nm | ps/nm$^2$/km | −0.48 | −0.51 | −0.58 |
| Kappa 1550 nm | | 305 | 293 | 273 |
| MFD 1550 nm | μm | 5.14 | 5.13 | 5.13 |
| Aeff 1550 nm | μm 2 | 22.1 | 22.2 | 22.3 |
| Pin Array @ 1550 nm | dB | 19 | 21 | 27 |
| Attenuation @ 1550 nm | dB/km | 0.423 | 0.424 | 0.424 |
| FOM @ 1550 nm | ps/nm/dB | 343 | 352 | 373 |
| \|D\| x Aeff (@ 1550 nm) | attosec | 3213 | 3313 | 3532 |

Figure 2:
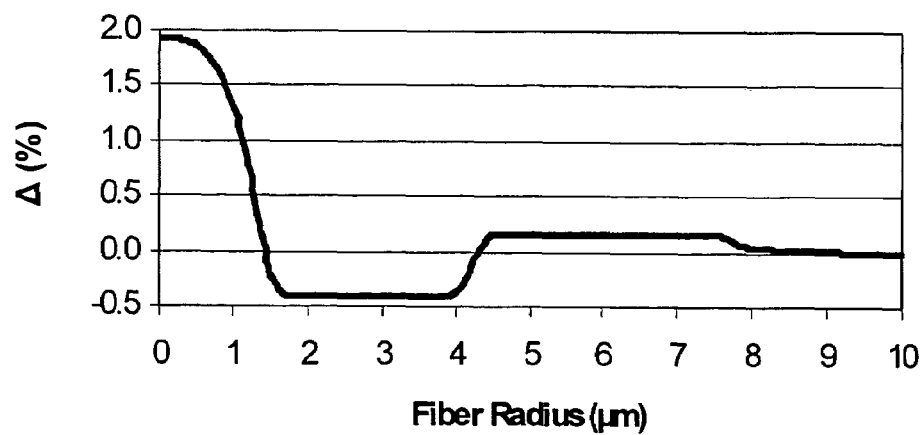
FIG. 2 shows a relative refractive index profile corresponding to a second embodiment of optical waveguide fiber as disclosed herein.

Tables 3-4 list an illustrative set of embodiments, Examples 4-10. FIG. 2 shows the corresponding relative refractive index profile of Example 4 in curve 2. Examples 5-10 have similar profiles, as further defined by Table 3. Embodiments such as these have first annular segments with a generally symmetric refractive index profile and second annular segments with a generally symmetric refractive index profile.

TABLE 3

| | | Example | | | | | | |
|---|---|---|---|---|---|---|---|---|
| | | 4 | 5 | 6 | 7 | 8 | 9 | 10 |
| $\Delta_{1MAX}$ | % | 1.93 | 2.00 | 1.97 | 1.98 | 1.98 | 1.98 | 1.97 |
| $\alpha 1$ | | 3.5 | 3.9 | 2.8 | 3.7 | 3.7 | 3.7 | 2.8 |
| R1 | μm | 1.5 | 1.4 | 1.7 | 1.5 | 1.4 | 1.4 | 1.4 |
| $\Delta_{2MIN}$ | % | −0.41 | −0.37 | −0.57 | −0.40 | −0.41 | −0.42 | −0.61 |
| R2 | μm | 4.3 | 4.4 | 4.3 | 4.4 | 4.4 | 4.4 | 4.3 |
| W2 | μm | 2.9 | 3.0 | 2.6 | 2.9 | 3.0 | 3.0 | 2.9 |
| $R_{2MID}$ | μm | 2.9 | 2.9 | 3.0 | 3.0 | 2.9 | 2.9 | 2.8 |
| $\Delta_{3MAX}$ | % | 0.16 | 0.18 | 0.25 | 0.19 | 0.19 | 0.19 | 0.25 |
| R3HHi | μm | 4.4 | 4.5 | 4.3 | 4.5 | 4.5 | 4.4 | 4.3 |
| R3HHJ | μm | 7.8 | 7.2 | 7.4 | 7.2 | 7.2 | 7.2 | 7.4 |
| HHPW3 | μm | 3.4 | 2.7 | 3.1 | 2.7 | 2.7 | 2.8 | 3.1 |
| $R_{3HHMID}$ | μm | 6.1 | 5.9 | 5.9 | 5.9 | 5.9 | 5.8 | 5.9 |
| $R3 = R_{CORE}$ | μm | 8.0 | 7.8 | 7.6 | 7.4 | 7.4 | 7.4 | 7.6 |
| W3 | μm | 3.7 | 3.4 | 3.4 | 3.0 | 3.0 | 3.0 | 3.4 |
| $R_{3MID}$ | μm | 6.2 | 6.1 | 5.9 | 5.9 | 5.9 | 5.9 | 5.9 |

TABLE 4

| | | Example | | | | | | |
|---|---|---|---|---|---|---|---|---|
| | | 4 | 5 | 6 | 7 | 8 | 9 | 10 |
| Dispersion | | | | | | | | |
| @ 1530 nm | ps/nm/km | −157 | −163 | −205 | −171 | −176 | −185 | −227 |
| @ 1540 nm | ps/nm/km | −163 | −170 | −216 | −179 | −184 | −193 | −239 |
| @ 1546 nm | ps/nm/km | −167 | −174 | −221 | −183 | −189 | −198 | −246 |
| @ 1550 nm | ps/nm/km | −170 | −177 | −225 | −185 | −191 | −201 | −250 |
| @ 1560 nm | ps/nm/km | −176 | −183 | −232 | −192 | −198 | −208 | −258 |
| @ 1570 nm | ps/nm/km | −181 | −189 | −237 | −197 | −204 | −213 | −263 |
| D. Slope @ 1546 nm | ps/nm$^2$/km | −0.63 | −0.66 | −0.90 | −0.68 | −0.73 | −0.77 | −1.04 |
| D. Slope @ 1550 nm | ps/nm$^2$/km | −0.61 | −0.65 | −0.83 | −0.65 | −0.70 | −0.73 | −0.94 |
| Kappa 1550 nm | | 277 | 273 | 270 | 283 | 272 | 273 | 265 |
| MFD 1550 nm | μm | 4.89 | 4.89 | 4.85 | 4.91 | 4.91 | 4.94 | 4.87 |
| Aeff 1550 nm | μm2 | 20.0 | 20.0 | 21.0 | 20.4 | 20.6 | 21.0 | 21.8 |
| Pin Array @ 1550 nm | dB | 35 | 36 | 36 | 49 | 55 | 65 | 54 |
| Attenuation @ 1550 nm | dB/km | 0.438 | 0.442 | 0.443 | 0.443 | 0.443 | 0.444 | 0.444 |
| FOM @ 1550 nm | ps/nm/dB | 387 | 400 | 507 | 418 | 432 | 452 | 563 |
| \|D\| x Aeff (@ 1550 nm) | attosec | 3389 | 3530 | 4722 | 3790 | 3941 | 4218 | 5455 |

Figure 3:
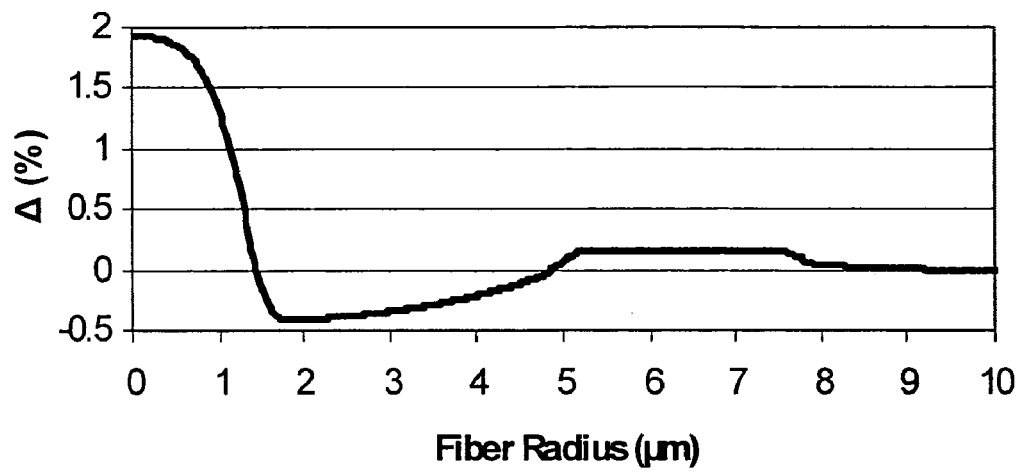
FIG. 3 shows a relative refractive index profile corresponding to a third embodiment of optical waveguide fiber as disclosed herein.
Figure 4:
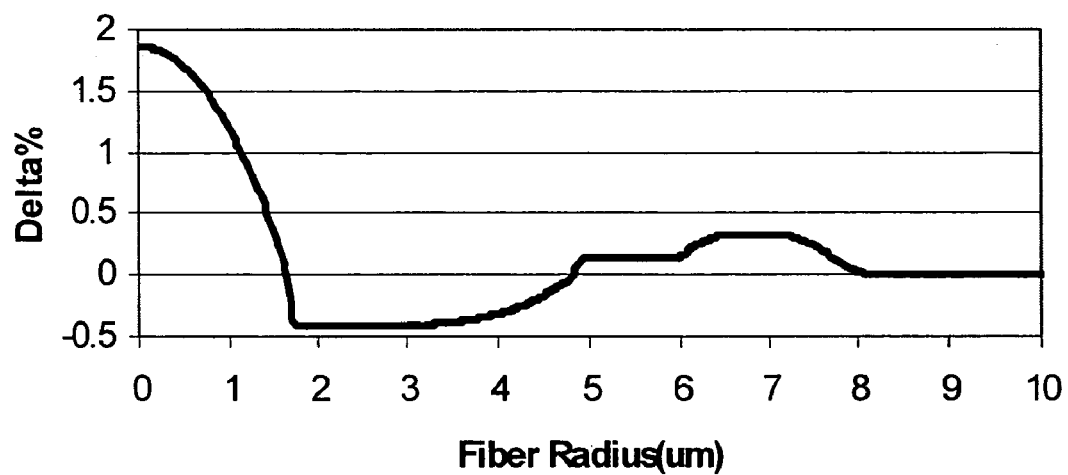
FIG. 4 shows a relative refractive index profile corresponding to a fourth embodiment of optical waveguide fiber as disclosed herein.

Tables 5-6 list an illustrative set of embodiments, Examples 11-15. FIG. 3 shows the corresponding relative refractive index profile of Example 11 in curve 3. Examples 12, 14 and 15 have similar profiles, as further defined by Table 5. Embodiments such as these have first annular segments with a generally asymmetric refractive index profile and second annular segments with a generally symmetric refractive index profile. FIG. 4 shows the corresponding relative refractive index profile of Example 13 in curve 3. Embodiments such as these have first annular segments with a generally asymmetric refractive index profile and second annular segments with a generally asymmetric refractive index profile.

TABLE 5

| | | Example | | | | |
|---|---|---|---|---|---|---|
| | | 11 | 12 | 13 | 14 | 15 |
| $\Delta_{1MAX}$ | % | 1.93 | 2.00 | 1.87 | 1.97 | 1.98 |
| $\alpha 1$ | | 3.5 | 3.9 | 2.0 | 2.8 | 3.7 |
| R1 | µm | 1.4 | 1.4 | 1.7 | 1.5 | 1.4 |
| $\Delta_{2MIN}$ | % | −0.41 | −0.37 | −0.41 | −0.56 | −0.40 |
| R2 | µm | 4.9 | 5.0 | 4.8 | 4.6 | 4.9 |
| W2 | µm | 3.5 | 3.6 | 3.1 | 3.1 | 3.5 |
| $R_{2MID}$ | µm | 3.2 | 3.2 | 3.3 | 3.1 | 3.2 |
| $\Delta_{3MAX}$ | % | 0.16 | 0.18 | 0.33 | 0.25 | 0.19 |
| R3HHi | µm | 5.1 | 5.2 | 6.0 | 4.8 | 5.0 |
| R3HHj | µm | 7.8 | 7.2 | 7.7 | 7.4 | 7.2 |
| HHPW3 | µm | 2.7 | 2.0 | 1.7 | 2.6 | 2.2 |
| $R_{3HHMID}$ | µm | 6.5 | 6.2 | 6.9 | 6.1 | 6.1 |
| R3 = $R_{CORE}$ | µm | 8.0 | 7.8 | 8.0 | 7.6 | 7.4 |
| W3 | µm | 3.1 | 2.8 | 3.2 | 3.0 | 2.5 |
| $R_{3MID}$ | µm | 6.5 | 6.4 | 6.4 | 6.1 | 6.2 |

TABLE 6

| | | Example | | | | |
|---|---|---|---|---|---|---|
| | | 11 | 12 | 13 | 14 | 15 |
| Dispersion | | | | | | |
| @ 1530 nm | ps/nm/km | −138 | −140 | −141 | −174 | −154 |
| @ 1540 nm | ps/nm/km | −143 | −146 | −147 | −181 | −160 |
| @ 1546 nm | ps/nm/km | −146 | −149 | −151 | −186 | −163 |
| @ 1550 nm | ps/nm/km | −148 | −152 | −153 | −188 | −166 |
| @ 1560 nm | ps/nm/km | −154 | −157 | −158 | −195 | −172 |
| @ 1570 nm | ps/nm/km | −159 | −163 | −162 | −200 | −177 |
| D. Slope @ 1546 nm | ps/nm$^2$/km | −0.54 | −0.58 | −0.56 | −0.70 | −0.60 |
| D. Slope @ 1550 nm | ps/nm$^2$/km | −0.53 | −0.58 | −0.54 | −0.67 | −0.59 |
| Kappa 1550 nm | | 279 | 259 | 284 | 282 | 282 |
| MFD 1550 nm | µm | 4.84 | 4.80 | 5.13 | 4.82 | 4.87 |
| Aeff 1550 nm | µm2 | 19.0 | 18.6 | 22.2 | 19.9 | 19.5 |
| Pin Array @ 1550 nm | dB | 27 | 29 | 25 | 23 | 40 |
| Attenuation @ 1550 nm | dB/km | 0.437 | 0.441 | 0.424 | 0.441 | 0.442 |
| FOM @ 1550 nm | ps/nm/dB | 340 | 344 | 360 | 427 | 375 |
| |D| × Aeff (@ 1550 nm) | attosec | 2826 | 2817 | 3394 | 3741 | 3242 |

In the optical fibers disclosed herein, the alpha ("a") of the relative refractive index profiles of the central segment is between 2.5 and 4.0.

In the optical fibers disclosed herein, $\Delta_{3MAX}$ is less than 0.35%. In the optical fibers disclosed herein, $\Delta_{3MAX}$ is preferably greater than or equal to 0.10%.

In some embodiments, such as Examples 1-15, $\Delta_{3MAX}$ is less than or equal to 0.33%. In some embodiments, such as Examples 3-10, 11-12, 14-15, $\Delta_{3MAX}$ is less than or equal to 0.25%. In some embodiments, such as Examples 3-5, 7-9, 11-12, and 15, $\Delta_{3MAX}$ is less than or equal to 0.20%. In some embodiments, such as Examples 3, $\Delta_{3MAX}$ is less than or equal to 0.15%.

In some embodiments, such as those exemplified by Examples 1-10, the first annular segment comprising a substantially constant relative refractive index for a radial width of greater than 2 µm. In other embodiments, such as those exemplified by Examples 11-15, the first annular segment comprises an asymmetric relative refractive index profile, and in some of these embodiments, such as Example 15, the lowest relative refractive index is located at a radius less than $R_{2MID}$.

In some embodiments, such as Example 1, the second annular segment comprising a substantially constant relative refractive index for a radial width of greater than 1 µm. Optical fibers such as Example 11 have a second annular segment comprising a substantially constant relative refractive index for a radial width of greater than 2 µm. Preferably, the portion of the second annular segment that has a substantially constant relative refractive index is the innermost portion of that segment.

As used herein, a substantially constant relative refractive index means that the relative refractive index does vary by no more than +/−0.05%, preferably by no more than +/−0.02%, over a given radial width.

In one aspect, an optical fiber transmission line is disclosed herein comprising a transmission optical fiber comprising dispersion between 14 and 20 ps/nm-km at all wavelengths between 1530 and 1570 nm, and a dispersion compensating fiber optically coupled to the transmission optical fiber. The DCF may be disposed in a module or the DCF may be deployed outside of a module.

Embodiments of the DCF disclosed herein are suitable for incorporation into an optical fiber transmission line that also comprises a transmission optical fiber having a dispersion at 1550 nm between 14 and 22 ps/nm-km and a dispersion slope at 1550 nm less than 0.080 ps/nm$^2$-km, and in some embodiments between 0.055 and 0.070 ps/nm$^2$-km, and in other embodiments between 0.058 and 0.065 ps/nm$^2$-km. The DCF disclosed herein is also suitable for incorporation into an optical fiber transmission system, wherein the DCF is coiled within a dispersion compensation module or disposed in a cable.

Figure 5:
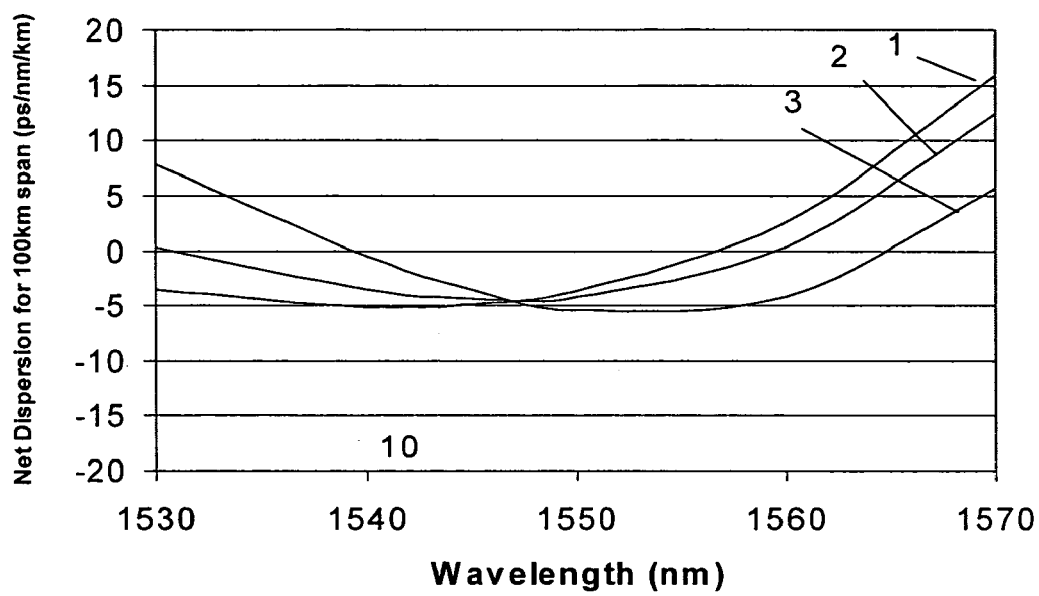
FIG. 5 shows net dispersion vs. wavelength for a 100 km span comprised of single mode positive dispersion fiber and the DCF of Examples 1-3.
Figure 6:
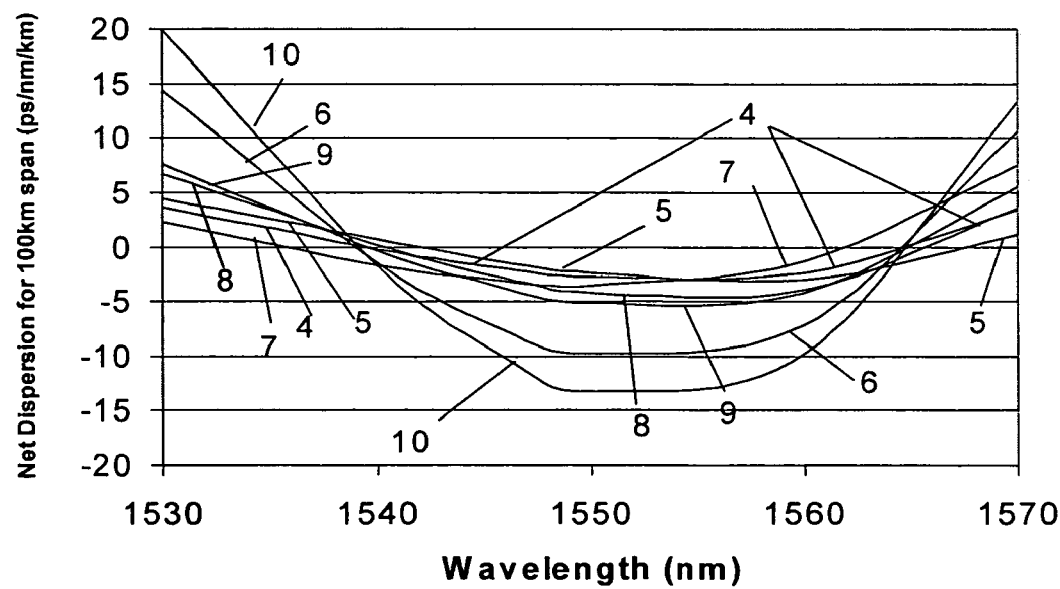
FIG. 6 shows net dispersion vs. wavelength for a 100 km span comprised of single mode positive dispersion fiber and the DCF of Examples 4-10.
Figure 7:
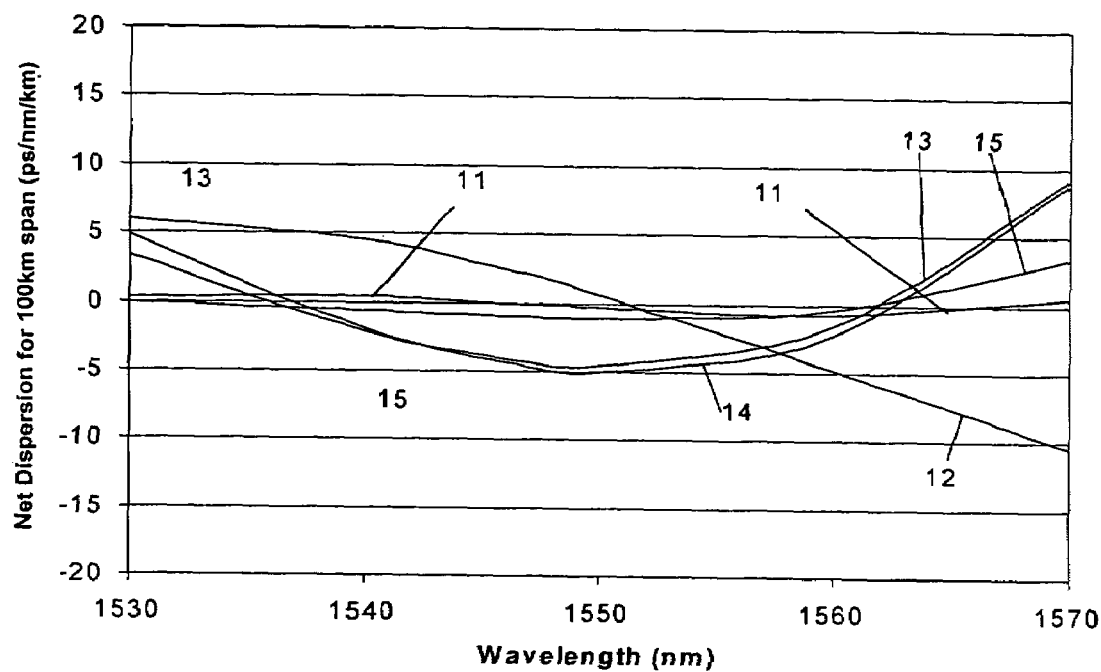
FIG. 7 shows net dispersion vs. wavelength for a 100 km span comprised of single mode positive dispersion fiber and the DCF of Examples 11-15.

The low attenuation of the optical fibers disclosed herein permits optical coupling with a positive dispersion positive slope optical fiber, such as SMF-28e® optical fiber manufactured and sold by Corning Incorporated, can result in a low overall attenuation optical transmission line. For example, for a positive dispersion positive slope optical fiber having dispersion of 15.5, 16.1, 16.5, 16.7, 17.3, and 17.9 at 1530, 1540, 1546, 1550, 1560, and 1570 nm, respectively, and attenuation of 0.19 dB/km at 1550 nm, an appropriate length of the positive dispersion fiber and of the DCF is provided to total 100 km, and the overall attenuation at 1550 nm of the 100 km span is less than 0.22 dB/km, as illustrated in Table 7 for DCF Examples 1-15 above. As seen in Table 7, the net dispersion range from 1530 to 1570 nm is +/−20 ps/nm/km or less, and the magnitude of the average net dispersion from 1530 to 1570 nm for the 100 km span is less than or equal to 0.3 ps/nm/km, preferably less than or equal to 0.2 ps/nm/km, more preferably less than or equal to 0.1 ps/nm/km, and even more preferably less than or equal to 0.05 ps/nm/km. FIGS. 5 and 6 show the net dispersion for such 100 km spans using the DCF of Examples 1-3 and 4-10, respectively, and FIG. 6 shows the net dispersion for such 100 km spans using the DCF of Examples 11-15. As seen from Table 7 and FIGS. 5, 6 and 7, the optical fibers disclosed herein are well suited to compensate the dispersion of such transmission fiber, particularly at wavelengths between 1530 and 1570 nm, and especially for wavelengths around 1550 nm.

TABLE 7

| Example | Positive Dispersion fiber (km) | DCF (km) | Net Dispersion range in C-band for 100 km ps/nm/km | Average net dispersion in C-band for 100 km ps/nm/km | Attn 1550 dB/km |
|---|---|---|---|---|---|
| 1 | 89.66 | 10.34 | (+/− 16) | 0.243 | 0.214 |
| 2 | 89.91 | 10.09 | (+/− 13) | 0.145 | 0.213 |
| 3 | 90.41 | 9.59 | (+/− 8.0) | −0.070 | 0.212 |
| 4 | 91.02 | 8.98 | (+/− 3.8) | −0.023 | 0.211 |
| 5 | 91.35 | 8.65 | (+/− 4.5) | −0.067 | 0.210 |
| 6 | 93.04 | 6.96 | (+/− 15) | −0.143 | 0.206 |
| 7 | 91.72 | 8.28 | (+/− 7.5) | 0.054 | 0.209 |
| 8 | 91.95 | 8.05 | (+/− 7.0) | −0.075 | 0.209 |
| 9 | 92.29 | 7.71 | (+/− 8.0) | −0.067 | 0.208 |
| 10 | 93.69 | 6.31 | (+/− 20) | −0.241 | 0.205 |
| 11 | 89.88 | 10.12 | (+/− 0.8) | −0.005 | 0.213 |
| 12 | 90.07 | 9.93 | (+/− 11) | −0.273 | 0.213 |
| 13 | 90.12 | 9.88 | (+/− 9.2) | 0.055 | 0.213 |
| 14 | 91.83 | 8.17 | (+/− 9.0) | 0.026 | 0.209 |
| 15 | 90.84 | 9.16 | (+/− 3.5) | 0.041 | 0.211 |

The optical fibers disclosed herein can be made by a vapor deposition process, such as outside vapor deposition (OVD) process. Thus, for example, known OVD laydown, consolidation, and draw techniques may be advantageously used to produce the optical waveguide fiber disclosed herein. Other processes may be used, for example but in no way limited to, modified chemical vapor deposition (MCVD) or vapor axial deposition (VAD) or plasma chemical vapor deposition (PCVD).

Figure 8:
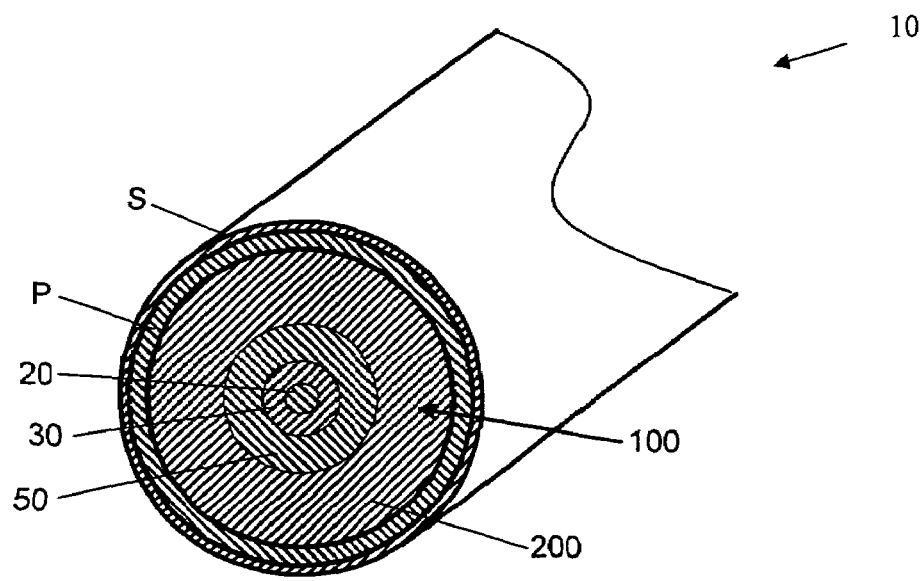
FIG. 8 shows an isometric cutaway representation of an embodiment of an optical waveguide fiber as disclosed herein.

FIG. 8 is a schematic representation (not to scale) of an optical waveguide fiber 10 as disclosed herein having core 100 and a cladding 200 directly adjacent and surrounding the core 100. The core comprises central segment 20, first annular segment 30 and second annular segment 50. The cladding 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 is surrounded by a primary coating P and a secondary coating S. The refractive index of the cladding 200 is used to calculate the relative refractive index percentage as discussed elsewhere herein. Referring to the Figures, the cladding 200 has a refractive index of $n_c$ surrounding the core which is defined to have a $\Delta(r)=0\%$, which is used to calculate the refractive index percentage of the various portions or regions of an optical fiber or optical fiber preform. Preferably, the cladding 200 consists of pure silica.

In some embodiments, the optical fiber disclosed herein has a silica-based core 100 and cladding 200. In some embodiments, the cladding 200 has an outer diameter, 2*R,max, of about 125 μm. In some embodiments, the outer diameter of the cladding 200 has a constant diameter along the length of the optical fiber. In some embodiments, the refractive index of the optical fiber has radial symmetry. In some embodiments, the outer diameter of the core 100 has a constant diameter along the length of the optical fiber. In some embodiments, one or more coatings surround and are in contact with the cladding. The coating may be a polymer coating such as acrylate. In some embodiments, the coating has a constant diameter, radially and along the length of the fiber.

It should be understood that the depiction of refractive index profiles such as in FIG. 1 do not show the entire cladding 200.

In some embodiments, the optical fibers disclosed herein have a low water content having an attenuation curve which exhibits a relatively low, or no, water peak in a particular wavelength region, especially around 1380 nm. Methods of producing low water peak optical fiber can be found in PCT Application Publication Numbers WO00/64825, WO01/47822, and WO02/051761, the contents of each being hereby incorporated by reference.

The dispersion compensating optical fiber disclosed herein is thus highly dispersive, allowing shorter lengths of the DCF to be optically coupled with transmission fiber, such as conventional single mode fiber, thereby reducing insertion losses and package sizes. The product of the effective area and dispersion is sufficiently high to reduce nonlinear impairments. The DCF exhibits low attenuation and high figure of merit.

As used herein, the word "between" is inclusive of the stated endpoint values. For example, a value stated to be between 1 and 3 means that the value can be 1, or 3, or intermediate 1 and 3.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
a core disposed about a centerline; and
a cladding surrounding and in contact with the core;

wherein the core and cladding define a relative refractive index profile;
wherein the core comprises:
   a central segment extending radially outward from the centerline;
   a first annular segment surrounding and in contact with the central segment; and
   a second annular segment surrounding and in contact with the first annular segment;
wherein the refractive index profile provides a dispersion at 1550 nm more negative than −145 ps/nm/km, a kappa at 1550 nm greater than 250 nm, and a figure of merit at 1550 nm of greater than 330 ps/nm/dB, wherein the kappa is the ratio of dispersion at 1550 nm divided by dispersion slope at 1550 nm, and wherein the figure of merit is the absolute magnitude of the ratio of dispersion at 1550 nm divided by spectral attenuation at 1550 nm.

2. The optical fiber of claim 1 wherein dispersion at 1550 nm is between −145 and −250 ps/nm/km.

3. The optical fiber of claim 1 wherein kappa at 1550 nm is between 260 and 305 ps/nm/km.

4. The optical fiber of claim 1 wherein the figure of merit at 1550 nm is between 340 and 565 ps/nm/dB.

5. The optical fiber of claim 1 wherein the spectral attenuation at 1550 nm is no more than 0.45 dB/km.

6. The optical fiber of claim 1 The optical fiber of claim 1 wherein the product of the effective area at 1550 nm and the absolute magnitude of the dispersion at 1550 nm is greater than 2800 attoseconds.

7. The optical fiber of claim 1 wherein the refractive index profile provides dispersion of between −130 and −270 ps/nm/km at all wavelengths between 1530 and 1570 nm.

8. The optical fiber of claim 1 wherein the dispersion slope at 1550 nm is between −0.45 and −1.00 ps/nm$^2$/km.

9. The optical fiber of claim 1 wherein the second annular segment comprises a maximum relative refractive index $\Delta_{3MAX}$ less than or equal to 0.35%.

10. The optical fiber of claim 1 wherein the second annular segment comprises an inner portion comprising a radial width between 1.0 and 1.5 μm and a maximum relative refractive index less than or equal to 0.15%.

11. The optical fiber of claim 1 wherein the central segment comprises a maximum relative refractive index $\Delta_{1MAX}$ greater than 1.80%.

12. The optical fiber of claim 1 wherein the first annular segment comprises a minimum relative refractive index $\Delta_{2MIN}$ more negative than −0.35%.

13. The optical fiber of claim 1 wherein the central segment extends to a radius, R1, between 1.0 and 2.0 μm.

14. The optical fiber of claim 1 wherein the first annular segment extends to a radius, R2, between 4.0 and 5.0 μm.

15. The optical fiber of claim 1 wherein the first annular segment extends for a radial width, $W_2$, between 2.5 and 3.7 μm.

16. The optical fiber of claim 1 wherein the first annular segment has a midpoint, $R_{2MID}$, between 2.5 and 3.5 μm.

17. The optical fiber of claim 1 wherein the second annular segment extends to a radius, R3, between 7.2 and 8.2 μm.

18. The optical fiber of claim 1 wherein the second annular segment extends for a radial width, $W_3$, between 2.4 and 3.9 μm.

19. The optical fiber of claim 1 wherein the second annular segment has a midpoint, $R_{3MID}$, between 5.8 and 6.5 μm.

20. An optical fiber transmission line comprising:
   a transmission optical fiber comprising dispersion between 14 and 20 ps/nm-km at all wavelengths between 1530 and 1570 nm; and
   the dispersion compensating fiber of claim 1 optically coupled to the transmission optical fiber.

* * * * *